No. 860,654. PATENTED JULY 23, 1907.
A. E. GAGNON.
FRICTION CLUTCH.
APPLICATION FILED DEC. 24, 1906.
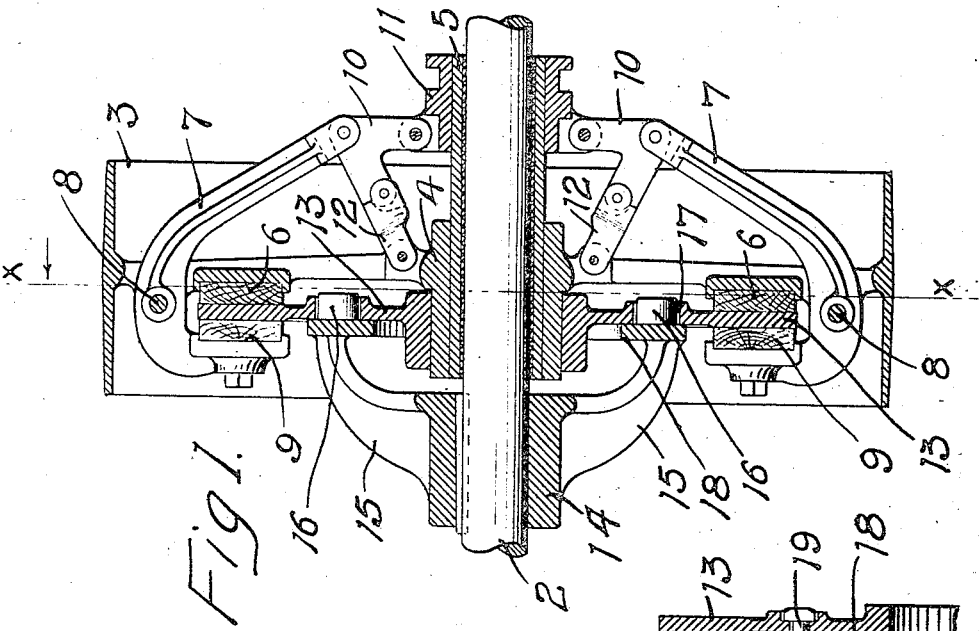
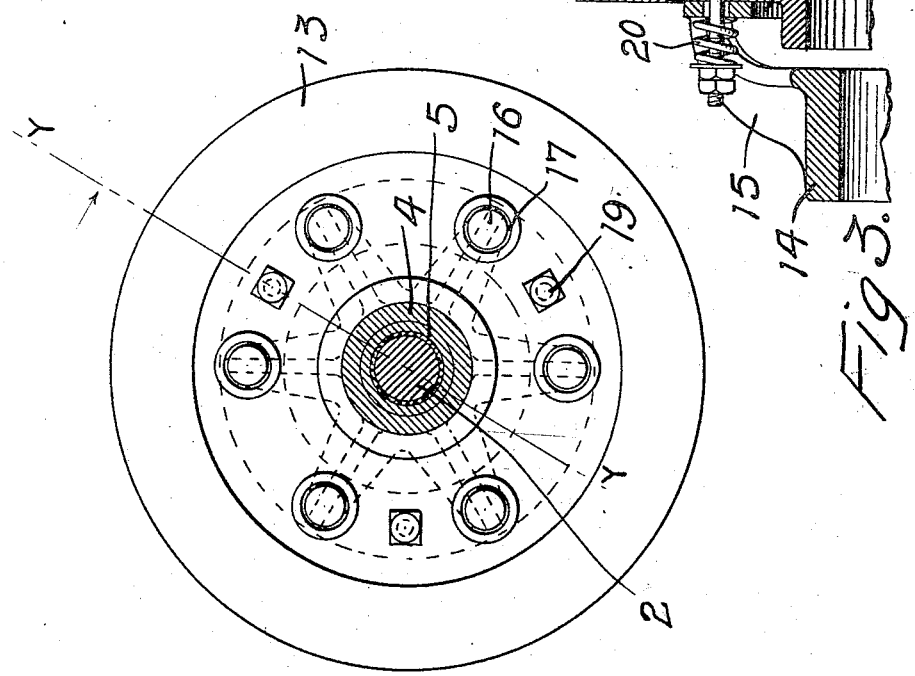
WITNESSES
INVENTOR
ANDREW E. GAGNON
BY
HIS ATTORNEYS

UNITED STATES PATENT OFFICE.

ANDREW E. GAGNON, OF MINNEAPOLIS, MINNESOTA.

FRICTION-CLUTCH.

No. 860,654.  Specification of Letters Patent.  Patented July 23, 1907.

Application filed December 24, 1906. Serial No. 349,283.

*To all whom it may concern:*

Be it known that I, ANDREW E. GAGNON, of Minneapolis, Hennepin county, Minnesota, have invented certain new and useful Improvements in Friction-Clutches, of which the following is a specification.

The object of my invention is to provide a friction clutch wherein all danger of breakage between the gripping surfaces of the clutch and the hub of the pulley will be avoided. As usually constructed clutches of this type have arms secured on the shaft and supporting the gripping surfaces and these arms frequently become broken, particularly when subjected to a sudden or severe strain, and cause considerable delay and annoyance in the operation of the pulley and its connections.

My invention consists generally in various constructions and combinations, all as hereinafter described and particularly pointed out in the claims.

In the accompanying drawings, forming part of this specification, Figure 1 is a sectional view of a friction pulley embodying my invention. Fig. 2 is a sectional view on the line *x—x* of Fig. 1. Fig. 3 is a sectional view on the line *y—y* of Fig. 2.

In the drawing, 2 represents a shaft and 3 a pulley having a hub 4 splined on a sleeve 5 that is loosely journaled on the shaft 2. The pulley has a bearing block 6 and arms 7 pivoted at 8 on the pulley, and carrying blocks 9 and operated by means of bell crank levers 10 having one arm pivoted to a sliding collar 11 and the other pivoted to links 12 that are mounted on the hub 4. A disk 13 is loosely journaled on the hub 4 and has its peripheral edge extending outwardly between the bearing blocks 6 and 9 to be gripped and held thereby when the arms 7 are moved to their locking position. The disk extends radially in a straight line, preferably, from its bearing point on the hub to its place of contact with the gripping blocks. A hub 14 is keyed on the shaft 2 and has a series of arms 15 radiating therefrom and terminating in inwardly turned ends 16 that fit loosely into sockets 17 provided in the web of the disk 13. These arms permit the disk to rock back and forth and move slightly in a rotary direction but prevent it from moving in such direction for any considerable distance. The arms are connected with one another by webs 18, and bolts 19 pass through holes in these webs and in the disk 13 and have springs 20 which yieldingly hold the ends 16 in their sockets but allow the disk to rock or sway lengthwise of the shaft to accommodate itself to the different positions of the gripping blocks or the pulley without throwing unnecessary or undue strain upon the arms 15 and their connection with the shaft. When the pulley is not in use the disk will turn freely on the hub of the pulley but when the gripping blocks are moved into engagement with the surface of the disk it will be prevented from turning and the movement of the shaft will be transmitted through the arms 15 to the disk to lock the pulley on the shaft. The loose connection between the disk and the arms, and the manner of mounting the disk directly upon the hub of the pulley will relieve the parts of a large proportion of the strain and the danger of breakage to which they are ordinarily subjected in a clutch of this kind.

I claim as my invention:—

1. The combination, with a shaft, of a loose pulley thereon, a friction disk loosely mounted on the hub of said pulley and having a gripping surface, arms pivoted on said pulley and having gripping blocks, means for operating said arms, a hub secured on said shaft and provided with arms having loose connections with said disk, substantially as described.

2. The combination, with a shaft, of a pulley loosely mounted thereon, a loosely mounted friction disk having a gripping surface, arms pivoted on said pulley and having gripping blocks and mechanism for operating said arms, arms secured on said shaft and connected with said disk and permitting said disk to rock or sway lengthwise of said shaft but locking it against continued rotary movement, substantially as described.

3. The combination, with a shaft, of a loose pulley thereon, a loosely mounted friction disk having a gripping surface, arms pivoted on said pulley and provided with gripping blocks, mechanism for operating said arms, and means for locking said disk against continued rotary movement but permitting oscillation of the same lengthwise of said shaft, substantially as described.

4. The combination, with a shaft, of a loose pulley thereon, a loosely mounted friction disk having a gripping surface, arms pivoted on said pulley and provided with gripping blocks and mechanism for operating said arms, arms secured on said shaft and having ends fitting loosely within sockets in said disk, webs connecting said arms with one another and bolts passing loosely through holes in said webs and said disk, and having coiled springs for yieldingly holding the ends of said arms in said sockets.

5. The combination, with a shaft, of a loose pulley thereon, a member having a gripping surface, means carried by said pulley for gripping said surface to lock said pulley and member together, and means secured on said shaft and having arms fitting loosely within sockets in said member and whereby a limited movement of said member is permitted to take up the shock or jar arising from the sudden starting of the pulley.

6. The combination, with a shaft, of a loose pulley thereon, a loosely mounted friction disk having a gripping surface, means on said pulley for engaging said surface and locking said disk and pulley together, and means for locking said disk against continued rotary movement but permitting oscillation of the same lengthwise of said shaft said means comprising arms secured on said shaft and fitting loosely within sockets provided at intervals in said disk, substantially as described.

In witness whereof, I have hereunto set my hand this 15th day of December, 1906.

ANDREW E. GAGNON.

Witnesses:
 RICHARD PAUL,
 J. B. ERA.